United States Patent [19]

Matsuda et al.

[11] Patent Number: 5,302,568
[45] Date of Patent: Apr. 12, 1994

[54] HYDROGENATION CATALYST AND PRODUCTION PROCESS THEREOF

[75] Inventors: Morio Matsuda; Masamitsu Horio, both of Wakayama, Japan

[73] Assignee: Kao Corporation, Tokyo, Japan

[21] Appl. No.: 957,378

[22] Filed: Oct. 7, 1992

[30] Foreign Application Priority Data

Oct. 9, 1991 [JP] Japan .................. 3-261768

[51] Int. Cl.$^5$ .................. B01J 23/78; B01J 23/72; B01J 23/74; B01J 37/03
[52] U.S. Cl. .................. 502/331; 502/328; 502/329; 502/244; 502/66
[58] Field of Search .................. 502/328, 329, 331, 244, 502/66

[56] References Cited

U.S. PATENT DOCUMENTS

| | | | |
|---|---|---|---|
| 4,144,198 | 3/1979 | Miya et al. | 502/331 |
| 4,252,689 | 2/1981 | Miya | 502/331 |
| 4,278,567 | 7/1981 | Miya et al. | 502/331 |
| 5,120,700 | 6/1992 | Matsuda et al. | 502/331 X |

FOREIGN PATENT DOCUMENTS 2045106 10/1980 United Kingdom .

*Primary Examiner*—Helen M. S. Sneed
*Assistant Examiner*—Douglas J. McGinty
*Attorney, Agent, or Firm*—Sughrue, Mion, Zinn, Macpeak & Seas

[57] ABSTRACT

A catalyst for hydrogenation use in which the carrier of the catalyst comprises at least one compound from oxides and hydroxides of aluminum, silicon, titanium, zirconium, magnesium and iron, zeolites or silica-alumina, and the catalyst has an atomic ratio (the atomic ratio of the entire catalyst including the carrier, in the case of the use of an aluminum atom-containing substance as the carrier) of Cu/Fe/Al/(an alkali metal and/or an alkaline earth metal)/Zn=1/0.4 to 2.5/0.5 to 5.0/0.001 to 0.4/0 to 1.0. According to the present invention, a copper-iron-aluminum catalyst having markedly high activity and selectivity can be obtained, and, when the catalyst is used, higher alcohols having high purity can be obtained easily.

9 Claims, No Drawings

HYDROGENATION CATALYST AND PRODUCTION PROCESS THEREOF

FIELD OF THE INVENTION

This invention relates to a catalyst for hydrogenation having high activity and high selectivity, which comprises copper-iron-aluminum-an alkali metal and/or an alkaline earth metal, or copper-iron-aluminum-an alkali metal and/or an alkaline earth metal-zinc. It also relates to a process for the production of the hydrogenation catalyst.

BACKGROUND OF THE INVENTION

Higher alcohols are produced, in general, by the reduction of corresponding higher fatty acid methyl esters under high temperature and high pressure conditions in an atmosphere of hydrogen.

A copper-chromium oxide-based catalyst, generally called a "copper-chromite catalyst", has been used in this type of reaction. The processes for the production of this catalyst have hardly been improved since the initial disclosure thereof in *Industrial and Engineering Chemistry*, vol.26, p.878 (1936). This catalyst has a serious disadvantage in that a large amount of hexavalent chromium ions are discharged in the production of the catalyst. In order to prevent environmental pollution, the heavy metals are collected by a suitable method. However, a final treatment method for heavy metal sludge produced in this method has not yet been established.

With the aim of overcoming such problem, copper-iron-aluminum catalysts produced by various processes have been proposed, for instance, in JP-A-53-92395, JP-A-55-8820 and JP-B-58-50775 (the term "JP-A" as used herein means an "unexamined published Japanese patent application", and the term "JP-B" as used herein means an "examined Japanese patent publication"). Though these catalysts are superior to the generally used copper-chromite catalyst in terms of activity, selectivity and durability, they have the disadvantage in that large scale filtration equipment is required because of their slow filtration rate when they are filtered out from catalyst-precipitated slurries during the production of a catalyst (JP-A-53-92395, JP-A-55-8820), in addition to other problems such as a filtration trouble due to considerable atomization of the catalyst when product after the hydrogen reduction is transferred from a high pressure reaction atmosphere into a normal pressure atmosphere through a high pressure valve. Also, a considerably high load is encountered upon the treatment of urea and ammonia waste water generated due to the use of urea as a catalyst precipitant (JP-A-55-129151).

SUMMARY OF THE INVENTION

With the object of providing an industrial scale production process for a pollution-free catalyst which can replace the copper-chromite catalyst that causes the problem of environmental pollution, the inventors of the present invention conducted intensive studies regarding the prevention of the aforementioned catalyst atomization problem and regarding simplification of the catalyst production process.

As a result, the present inventors found that a catalyst having markedly improved activity, selectivity, durability and filterability can be obtained without causing atomization of the catalyst, when at least one compound selected from the group consisting of oxides and hydroxides of aluminum, silicon, titanium, zirconium, magnesium and iron, zeolites and silica-alumina is used as a carrier and a hydroxide or a carbonate of an alkali metal or an alkaline earth metal is used as a precipitant instead of urea, and that a copper-iron-aluminum catalyst can be produced by a process in which the catalyst production steps are greatly simplified. The present invention has been accomplished on the basis of these findings.

Particularly, according to the present invention, there is provided a catalyst for hydrogenation use in which the carrier of the catalyst comprises at least one compound selected from the group consisting of oxides and hydroxides of aluminum, silicon, titanium, zirconium, magnesium and iron, zeolites and silica-alumina, and the catalyst has an atomic ratio (the atomic ratio is of the entire catalyst including the carrier, in the case of the use of an aluminum atom-containing substance as the carrier) of Cu/Fe/Al/(an alkali metal and/or an alkaline earth metal)/Zn = 1/0.4 to 2.5/0.5 to 5.0/0.001 to 0.4/0 to 1.0, preferably 1/0.6 to 2.0/0.8 to 3.0/0.01 to 0.1/0 to 0.5.

Another object of the present invention is to provide a process for producing the just described catalyst for hydrogenation use.

Other objects and advantages of the present invention will be made apparent as the description progresses.

DETAILED DESCRIPTION OF THE INVENTION

The copper-iron-aluminum catalyst of the present invention is produced by the following process (I) or (II).

Process (I) comprises the following steps (1), (2), (3) and (4) in that order:

(1) suspending at least one compound selected from the group consisting of oxides and hydroxides of aluminum, silicon, titanium, zirconium, magnesium and iron, zeolites and silica-alumina (hereinafter referred to as "carrier") in an aqueous medium with stirring, and reacting a water soluble copper salt and a water soluble iron salt with an alkaline substance in the suspension, thereby effecting precipitation of a copper compound and an iron compound on the surface of the carrier;

(2) reacting a water soluble aluminum salt with an alkaline substance in the suspension prepared in the above step (1), thereby effecting precipitation of an aluminum compound on the surface of the solid particles present in the suspension prepared in the above step (1);

(3) recovering the precipitate from the suspension prepared in the above step (2), followed by washing with water, to obtain a slurry or powder material; and (4) mixing (A) the slurry or powder material obtained in the above step (3) with (B) at least one compound selected from the group consisting of alkali metal salts, alkali metal hydroxides, alkaline earth metal salts and alkaline earth metal hydroxides, followed by drying and calcining of the resulting slurry or powder material.

Process (II) comprises the following steps (1), (2), (3) and (4) in that order:

(1) suspending a carrier in an aqueous medium, and reacting a water soluble copper salt and a water soluble iron salt with an alkaline substance in the suspension, thereby effecting precipitation of a copper compound and an iron compound on the surface of the carrier;

(2) (i) reacting a water soluble aluminum salt with an alkaline substance in the suspension prepared in the above step (1), or (ii) reacting a water soluble aluminum salt and a water soluble copper salt or a water soluble zinc salt, or a mixture of all three of these salts with an alkaline substance, in the suspension prepared in the above step (1), thereby effecting precipitation of a compound or a plurality of compounds on the surface of the solid particles present in the suspension prepared in the above step (1) (precipitation steps can be effected in any order when a plurality of compounds are precipitated), wherein the compound or the combination of compounds precipitated is/are selected from (a) an aluminum compound, (b) an aluminum compound and a copper compound, (c) an aluminum compound and a zinc compound and (d) an aluminum compound, a copper compound and a zinc compound;

(3) recovering the precipitate from the suspension prepared in the above step (2), followed by washing with water, to obtain a slurry or powder material; and (4) mixing (A) the slurry or powder material obtained in the above step (3) with (B) at least one compound selected from the group consisting of alkali metal salts, alkali metal hydroxides, alkaline earth metal salts and alkaline earth metal hydroxides, followed by drying and calcining of the resulting slurry or powder material.

The following disclosure deals with each step of the process for the production of the copper-iron-aluminum catalyst of the present invention in more detail.

STEP 1

The first step of the process of the present invention is carried out in the following manner.

First, a water soluble copper salt and a water soluble iron salt are dissolved in water in such amounts that the Cu/Fe atomic ratio is 1/0.4 to 2.5. A carrier is suspended in the resulting solution in an amount such that the atomic ratio of Cu/carrier metal atoms = 1/0.1 to 3.0. After heating the thus prepared suspension at a temperature of from 60° to 120° C., an aqueous solution of an alkaline substance is added to the heated suspension in an amount equivalent to the total amounts of copper and iron ions, thereby effecting precipitation of a copper compound and an iron compound on the surface of the catalyst carrier.

Examples of the water soluble copper salts used in the present invention include cupric sulfate, cupric chloride, cupric nitrate and the like. They may be used alone or as a mixture of two or more thereof.

Examples of the water soluble iron salts used in the present invention include ferrous sulfate, ferrous chloride, ferrous nitrate and the like. These iron salts may be used as a mixture of two or more thereof, but the single use of ferrous sulfate is most desirable from the economical point of view. A ferric salt may be used jointly in combination with such ferrous salts, but in a carefully chosen amount. This is because the addition of too much of the ferric salt will cause a deterioration of performance, especially in the physical properties, of the catalyst. A ferric salt may be used up to 50% by weight based on the total weight of the water soluble iron salts.

Examples of the alkaline substances used in the present invention include hydroxides, carbonates and the like of alkali metals and alkaline earth metals. The alkaline substance may be added to the suspension by any appropriate means, but preferably it is added in the form of an aqueous solution from a handling point of view.

When a hydroxide of an alkali metal or an alkaline earth metal is used as the alkaline substance, it is desirable to add an aqueous solution thereof dropwise and gradually, in order to prevent a decrease in the filterability of the precipitated catalyst. In the process of the present invention, it is most preferable to use an alkali metal carbonate.

The alkaline substance may be used in any optional concentration, but may be in a high concentration as a precipitant taking productivity of the catalyst into consideration. For example, in the case of sodium carbonate, a 5 to 23% (preferably, 20 to 23%) aqueous solution is appropriate.

At least one compound selected from the group consisting of oxides and hydroxides of aluminum, silicon, titanium, zirconium, magnesium and iron, zeolites and silica-alumina, which is used as a carrier in the first step, may be prepared in a reaction vessel and used as it is, or it may be used after preparing it separately.

The oxides and the hydroxides of titanium may be those of titanium (III) and those of titanium (IV). The oxides and the hydroxides of iron may be those of iron (II), those of iron (III), and those of iron (II) and iron (III). Therefore, FeO, $Fe_2O_3$, and $Fe_3O_4$ are exemplified as the oxide of iron. Examples of the zeolites include synthetic zeolites (e.g., type A, X, Y, L, Ω, etc.) and natural zeolites (e.g., cancrinite, chabazite, erionite, faujasite, gmelinite, mordenite, offretite, sodatite, etc.). The silica-alumina may have any silica-alumina ratio of from 0/100 to 100/0. Therefore, pure $SiO_2$ and pure $Al_2O_3$ may be included in the silica-alumina.

As the carriers, aluminum oxide and aluminum hydroxide are preferred. The carriers preferably have a relatively uniform particle size, with a mean particle size of from 0.1 to 500 μm, preferably from 0.4 to 50 μm. When the mean particle size of the carrier is lower than or higher than this range, catalytic activity and filterability cannot be simultaneously maintained at the desired levels of the present invention.

When the carrier is prepared in a reaction vessel, the preparation process may be effected, for example, by dissolving a ferric salt such as ferric sulfate, ferric nitrate, ferric chloride, or the like, in water in an amount to be used as the carrier, and then neutralizing the resulting solution with an iron ion-equivalent amount of an aqueous solution of an alkali metal carbonate, such as sodium carbonate, by dropwise addition of the same to the solution at a temperature of 60° C. to 120° C. When the carrier is prepared in a reaction vessel, the first step of the process of the present invention can then be carried out continuously by adding a copper salt and an iron salt to the resulting slurry without purifying the formed carrier precipitate. In this instance, a catalyst which shows highly stable performance can be produced when a carrier having uniform physical properties is used. In other words, it is advantageous to use a carrier having uniform physical properties for the purpose of producing the catalyst of the present invention on an industrial scale.

STEP 2

The second step of the process of the present invention is carried out in the following manner.

To the suspension obtained in the first step there are added dropwise (C) an aqueous solution of a water soluble aluminum salt (in this instance, the amount of the aluminum salt is adjusted to such a level that its mixing ratio with the water soluble copper salt used in the first step provides a Cu/Al atomic ratio of 1/0.1 to 5.0, preferably 1/0.5 to 3.0) and (D) an alkaline substance in an amount equivalent to the aluminum ions described in (C). Thereafter, the resulting suspension is maintained at a temperature of from 60° to 120° C. to effect precipitation of an aluminum compound. When heating of the suspension is carried out at a temperature over this temperature range, the resulting catalyst does not show the desired activity and selectivity.

Examples of the water soluble aluminum salts described above in (C) include aluminum sulfate, aluminum chloride, aluminum nitrate and various types of alum compounds, of which aluminum sulfate is particularly preferred. These salts may be used alone or as a mixture of two or more thereof.

In order to improve the activity and selectivity of the hydrogen reduction reaction, a copper compound, a zinc compound or a mixture thereof may be precipitated together with an aluminum compound by adding a water soluble copper salt, a water soluble zinc salt or a mixture thereof to the aqueous aluminum salt solution (C) in such an amount that the mixing ratio with the water soluble aluminum salt used in the aqueous solution described above in (C) provides an Al/Cu/Zn atomic ratio of 1/0 to 1/0 to 0.5 (preferably, 1/0 to 0.3/0 to 0.2).

Examples of the just described water soluble copper salts are the same as those already described in relation to the first step.

Examples of the water soluble zinc salts include zinc sulfate, zinc chloride, zinc nitrate and the like, of which zinc sulfate is particularly preferred from the economic point of view.

Examples of the alkaline substance just described in (D) are the same as those already described in relation to the first step. The alkaline substance is preferably added in the form of an aqueous solution from a handling point of view. Though the concentration of the alkaline substance is not particularly limited, it is used as an aqueous solution of preferably about 5 to 23% (more preferably about 20 to 23%) by weight in view of economy.

In order to prevent rapid changes in the pH value of the suspension, the aqueous solution of above (C) and the alkaline substance or its aqueous solution of above (D) are preferably added to the suspension simultaneously.

When other water soluble salts are used in addition to the water soluble aluminum salt, the second step may be effected in one step or by dividing it into two or more sub-steps.

Examples of various embodiments of second step are as follows.

(1) Single precipitation of an aluminum compound.
(2) Simultaneous precipitation of an aluminum compound and a copper compound.
(3) Simultaneous precipitation of an aluminum compound and a zinc compound.
(4) Simultaneous precipitation of an aluminum compound and a copper compound as a first sub-step, followed by simultaneous precipitation of an aluminum compound and a zinc compound as a second sub-step.
(5) Simultaneous precipitation of an aluminum compound and a copper compound as a first sub-step, followed by single precipitation of an aluminum compound as a second sub-step.
(6) Simultaneous precipitation of an aluminum compound and a zinc compound as a first sub-step, followed by simultaneous precipitation of an aluminum compound and a copper compound as a second sub-step.
(7) Simultaneous precipitation of an aluminum compound and a zinc compound as a first sub-step, followed by single precipitation of an aluminum compound as a second sub-step.
(8) Simultaneous precipitation of an aluminum compound, a copper compound and a zinc compound.
(9) Repetition (e.g., once or twice) of any combination of these steps.

A suspension thus prepared is adjusted to pH 7.0 or higher. Then, the suspension may optionally be subjected to aging for 0 to 8 hours. The aging is usually performed under precipitating condition with stirring and warming.

STEP 3

In the third step, the precipitate obtained in the second step is recovered in a conventional manner and then washed with water to obtain a slurry or powder material.

STEP 4

The fourth step of the production process of the present invention is carried out in the following manner.

Firstly, (A) the slurry or powder material obtained in the above step 3 is mixed with (B) at least one compound selected from the group consisting of alkali metal salts, alkali metal hydroxides, alkaline earth metal salts and alkaline earth metal hydroxides (referred to as "alkali metal/alkaline earth metal hydroxide and the like" hereinafter). In this instance, the alkali metal/alkaline earth metal hydroxide and the like are mixed in such an amount that an atomic ratio in the resulting mixture is Cu/(alkali metal and/or alkaline earth metal)=1/0.001 to 0.4. The alkali metal/alkaline earth metal hydroxide and the like may be added in the form of a powder or a particulate material, but preferably the same is added as an aqueous solution.

Examples of the alkali metal/alkaline earth metal hydroxide and the like include $Ba(OH)_2$, $Ca(OH)_2$, $BaCO_3$, NaOH and the like.

The slurry or powder material thus obtained is then subjected to drying and calcining. The calcining may be effected at a temperature in the range of from 100° to 1,200° C., preferably from 400° to 900° C. Though the calcining time is not particularly limited, the calcining may be carried out for 0.5 to 10 hours in view of economy. The thus calcined product can be used as it is without pulverization.

Though the catalyst of the present invention shows excellent properties such as high activity, high selectivity and the like due to the effect of the combined use of the aforementioned metals, any other metal such as a noble metal or the like may be added to the catalyst, provided that it does not harm the effects of the present invention. That is, in accordance with the present invention it is not intended to exclude the combined use of other metals.

The hydrogen reduction of a higher fatty acid ester using the thus produced catalyst may be carried out at a temperature in the range of from 130° to 350° C., preferably from 180° to 300° C., and under a hydrogen pressure in the range of from 10 to 300 kg/cm$^2$, preferably from 100 to 250 kg/cm$^2$. The catalyst may be used in an amount of from 0.1 to 20% by weight, preferably from 0.5 to 10% by weight, based on the weight of the higher fatty acid ester used as a starting material.

Examples of higher fatty acid esters which can be hydrogenated using the catalyst of the present invention include straight chain fatty acid esters, branched-chain fatty acid esters, unsaturated fatty acid esters and the like, each of which have 6 or more (generally, 6 to 22) fatty acid carbon atoms and at least one ester group. These fatty acid esters may be used alone or as a mixture of two or more thereof. The alcohol moiety of the higher fatty acid ester is preferably a lower alcohol having 1 to 4 carbon atoms, most preferably methanol. Illustrative examples of such higher fatty acid esters include fatty acid methyl esters of coconut oil, palm oil, palm kernel oil, rapeseed oil, beef tallow, fish oil, Orange Roughy and the like.

EXAMPLES

The following examples are provided to further illustrate the present invention. It is to be understood, however, that the examples are for purpose of illustration only and are not intended as a definition of the limits of the invention. In the following Examples, all catalysts were produced, unless otherwise indicated, in air under atmospheric pressure with stirring.

Example 1

A reactor equipped with a reflux condenser was charged with 300 g of water, 48 g of $CuSO_4 \cdot 5H_2O$, 59 g of $FeSO_4 \cdot 7H_2O$ and 12.14 g of aluminum hydroxide (Higilite H-32, available from Showa Denko K.K.) at room temperature. The temperature of the resulting mixture was increased to 96° C. with stirring. The mixture was then maintained at 95°±2° C. for 1 hour with stirring.

Keeping the temperature at 95°±2° C., a solution of 44.8 g of $Na_2CO_3$ dissolved in 150 g of water was dropwise added to the above mixture over about 80 minutes. During this reaction, the color of the precipitate which was initially blue-green gradually changed to brown and finally to black. The pH value after completion of the dropwise addition was found to be 8.95.

To this product were further dropwise added a solution which had been prepared by dissolving 4.8 g of $CuSO_4 \cdot 5H_2O$ and 46.8 g of $Al_2(SO_4)_3 \cdot 16H_2O$ in 109.2 g of water, simultaneously with another solution that had been prepared by dissolving 27.6 g of $Na_2CO_3$ in 98.2 g of water. In this instance, the mixture was maintained at 95°±2° C., and the metal salt solution and the alkaline substance solution were added over a time of 60 minutes and 30 minutes, respectively. The pH value was found to be 8.71 after completion of the dropwise addition of the alkaline substance solution and was 8.11 after the addition of the metal salt solution.

To this product there was further dropwise added over a period of 30 minutes a solution which has been prepared by dissolving 23.4 g of $Al_2(SO_4)_3 \cdot 16H_2O$ in 53.5 g of water. The pH value after completion of the dropwise addition was found to be 4.12. The mixture was maintained at 95°±2° C.

Finally, to the thus prepared mixture was further dropwise added over a period of 30 minutes an alkaline substance solution which had been prepared by dissolving 14.3 g of $Na_2CO_3$ in 54.9 g of water. The resulting mixture was adjusted to pH 10.5 by the dropwise addition of a 10% NaOH aqueous solution and then subjected to 1 hour of aging while keeping the pH thereof at 10.5. The mixture was maintained at 95°±2° C.

After completion of the aging, the reaction product was recovered by suction filtration. The filtration was quite easy, and the filtrate was colorless. The precipitate thus recovered was washed three times, each washing being with 450 ml of water. The thus washed precipitate was mixed with a solution which had been prepared by dissolving 4.21 g of $Ba(OH)_2$ in 320 g of water, and the resulting mixture was stirred for 30 minutes and then subjected to evaporation to dryness. The mixture was maintained at 95°±2° C. Thereafter, the thus dried product was lightly pulverized and then subjected to 1 hour of calcining at 750° C. in the air to obtain the desired catalyst.

The Cu/Fe/Al/Ba/Zn atomic ratio of this catalyst was found to be 1/1/1.81/0.063/0.

Examples 2 and 3

Catalysts were obtained by repeating the process of Example 1, except that the amount of barium hydroxide was changed as shown in Table 1.

Examples 4 to 6

Catalysts were obtained by repeating the process of Example 1, except that calcium hydroxide, sodium hydroxide or barium carbonate was used instead of barium hydroxide.

Examples 7 to 12

Catalysts were obtained by repeating the process of Example 1, except that titanium oxide, zirconium oxide, zeolite, silica-alumina, ferric oxide or magnesium oxide was used instead of aluminum hydroxide.

Examples 13 to 17

Catalysts were obtained by repeating the process of Example 1, except that the Cu/Fe/Al/Ba/Zn atomic ratio was changed as shown in Table 2.

Comparative Example 1

A reactor equipped with a reflux condenser was charged with 300 g of water, 48 g of $CuSO_4 \cdot 5H_2O$, 59 g of $FeSO_4 \cdot 7H_2O$ and 12.14 g of aluminum hydroxide (Higilite H-32, available from Showa Denko K.K.) at room temperature. The temperature of the resulting mixture was increased to 96° C. with stirring. The mixture was then maintained at 95°±2° C. for 1 hour with stirring.

Keeping the temperature at 95°±2° C., a solution of 44.8 g of $Na_2CO_3$ dissolved in 150 g of water was dropwise added to the above mixture over about 80 minutes. During this reaction, the color of the precipitate which was initially blue-green gradually changed to brown and finally to black. The pH value after completion of the dropwise addition was found to be 8.95.

To this product were further dropwise added a solution which had been prepared by dissolving 4.8 g of $CuSO_4 \cdot 5H_2O$ and 46.8 g of $Al_2(SO_4)_3 \cdot 16H_2O$ in 109.2 g of water, simultaneously with another solution that had been prepared by dissolving 27.6 g of $Na_2CO_3$ in 98.2 g of water. In this instance, the mixture was maintained at 95°±2° C., and the metal salt solution and the alkaline substance solution were added over a period of 60 minutes and 30 minutes, respectively. The pH value was found to be 8.71 after completion of the dropwise addition of the alkaline substance solution and 8.11 after the addition of the metal salt solution.

To this product there was further dropwise added over a period of 30 minutes at 95°±2° C. a solution which had been prepared by dissolving 23.4 g of $Al_2(SO_4)_3 \cdot 16H_2O$ in 53.5 g of water. The pH value after completion of the dropwise addition was found to be 4.12.

Finally, to the thus prepared mixture was further dropwise added over a period of 30 minutes an alkaline substance solution which had been prepared by dissolving 14.3 g of $Na_2CO_3$ in 54.9 g of water. The resulting mixture was adjusted to pH 10.5 by the dropwise addition of a 10% NaOH aqueous solution at 95°±2° C. and then subjected to 1 hour of aging while keeping the pH thereof at 10.5.

After completion of the aging, the reaction product was recovered by suction filtration. The filtration was quite easy, and the filtrate was colorless. The precipitate thus recovered was washed three times, each time with 450 ml of water, and then dried in a conventional manner. Thereafter, the thus dried product was lightly pulverized and then subjected to 1 hour of calcining at 750° C. in the air to obtain the desired catalyst.

The Cu/Fe/Al/(alkali metal/alkaline earth metal)/Zn atomic ratio of this catalyst was found to be 1/1/1.81/0/0.

Comparative Examples 2 to 4

Catalysts were obtained by repeating the process of Comparative Example 1, except that the Cu/Fe/Al/(alkali metal/alkaline earth metal)/Zn atomic ratio was changed as shown in Table 3.

Comparative Example 5

A reactor equipped with a reflux condenser was charged with 400 g of water, 40.7 g of $CuSO_4 \cdot 5H_2O$, 45.5 g of $FeSO_4 \cdot 7H_2O$ and 54.1 g of $Al_2(SO_4)_3 \cdot 16H_2O$, and the temperature of the resulting mixture was increased to 96° C. with stirring. Thereafter, the mixture was maintained at 95°±2° C. for 1 hour with mixing.

Keeping the temperature at 95°±2° C., a solution of 64.5 g $Na_2CO_3$ dissolved in 258 g of water was dropwise added to the above mixture over about 80 minutes. During this reaction, the color of the precipitate initially was blue-green but it gradually changed to brown and finally to black. The resulting mixture was adjusted to pH 10.5 by the dropwise addition of a 10% NaOH aqueous solution and then subjected to 1 hour of aging while keeping the pH thereof at 10.5. Thereafter, the desired catalyst was obtained in the same manner as described in Comparative Example 1.

Comparative Example 6

A reactor equipped with a reflux condenser was charged with 210 g of water, 33 6 g of $CuSO_4 \cdot 5H_2O$ and 41.3 g of $FeSO_4 \cdot 7H_2O$, and temperature of the resulting mixture was increased to 96° C. with stirring. Thereafter, the mixture was maintained at 95°±2° C. for 1 hour with stirring.

Keeping the temperature at 95°±2° C., a solution of 31.4 g $Na_2CO_3$ dissolved in 105 g of water was dropwise added to the above mixture over about 80 minutes. During this reaction, the color of the precipitate was initially blue-green but it gradually changed to brown and finally to black.

To this product were further dropwise added a solution which had been prepared by dissolving 3.4 g of $CuSO_4 \cdot 5H_2O$ and 65.5 g of $Al_2(SO_4) \colon 16H_2O$ in 153 g of water, simultaneously with another solution that had been prepared by dissolving 53.2 g of $Na_2CO_3$ in 189 g of water, while keeping the mixture at 95°±2° C.

Finally, to the thus prepared mixture were dropwise added a solution which had been prepared by dissolving 33 g of $Al_2(SO_4)_3 \cdot 16H_2O$ in 74.9 g of water and, simultaneously, another solution that had been prepared by dissolving 18.8 g of $Na_2CO_3$ in 66 g of water. After 1 hour of aging, the desired catalyst was obtained in the same manner as described in Comparative Example 1.

Examples 18 to 21

Catalysts were obtained by repeating the process of Example 1, except that the calcining temperature was changed to 450°, 600°, 900° or 1,050° C.

Test Example

A 150 g portion of coconut oil fatty acid methyl ester (to be referred to as "ME" hereinafter) was mixed with 3.75 g of each of the catalysts obtained in the Examples and Comparative Examples, and a hydrogenation reaction was carried out for 4 hours in a 500 ml capacity autoclave under a hydrogen pressure of 250 kg/cm², at a reaction temperature of 275° C. and at a hydrogen flow rate of 5 l/min. Samples were collected after 30, 60, 90, 120, 180 and 240 minutes of the reaction to measure saponification values.

The first order reaction velocity constant k ($\times 10^3$/min) was calculated based on the following formula:

$$k = (1/t) ln(SV_0 - SV_e)/(SV_t - SV_e)$$

where $SV_0$ is the saponification value of the starting material ME, $SV_t$ is the saponification value of the reaction product after t minutes of the reaction and $SV_e$ is the equilibrium saponification value at 275° C. and 250 kg/cm².

After completion of the reaction, the reactor was cooled down and the autoclave was opened to take out the reaction mixture from which the catalyst was subsequently removed by pressure filtration. The composition of the thus recovered reaction product was checked by means of gas chromatography.

Next, in order to measure the filtration rate, 150 g of ME was mixed with 7.50 g of each of the catalysts, and the reaction was carried out for 1 hour in a 500 ml capacity autoclave under a hydrogen pressure of 250 kg/cm², at a reaction temperature of 275° C. and at a hydrogen flow rate of 5 l/min. Thereafter, the entire reaction mixture was taken out through a high pressure valve without cooling and under a reduced pressure of hydrogen of 200 kg/cm².

The thus recovered slurry (58 g) was weighed and diluted to 255 g with dodecyl alcohol and then subjected to filtration testing under specified conditions (filtration pressure, 3 kg/cm²; filtration temperature, 50° C.), using a pressure filter (inner diameter, 3 cm) equipped with an external heating type temperature controller, to measure the filtration rate per unit time (F, $m^3/cm^2$-Hr).

The results are shown in Tables 1 to 3.

TABLE 1

(EXAMPLES 1 to 6)

| Example | Carrier | Atomic ratio Cu/Fe/Al/(alkali metal, alkaline earth metal)/Zn | Alkali metal/ alkaline earth metal hydroxide or the like | Catalyst calcining temp. (°C.) | Reaction velocity constant k ($\times 10^3$/min) | Filtration rate F ($m^3/cm^2$-Hr) | Alcohol | ME | Wax | Hydrocarbon | Others |
|---|---|---|---|---|---|---|---|---|---|---|---|
| 1 | Aluminum hydroxide | 1/1/1.81/0.063/0 | Ba(OH)$_2$ | 750 | 7.80 | 1.50 | 97.5 | 0.05 | 1.65 | 0.50 | 0.30 |
| 2 | Aluminum hydroxide | 1/1/1.81/0.006/0 | Ba(OH)$_2$ | 750 | 9.12 | 1.20 | 97.6 | 0.05 | 1.60 | 0.62 | 0.17 |
| 3 | Aluminum hydroxide | 1/1/1.81/0.300/0 | Ba(OH)$_2$ | 750 | 6.88 | 1.55 | 97.4 | 0.10 | 1.75 | 0.51 | 0.24 |
| 4 | Aluminum hydroxide | 1/1/1.81/0.063/0 | Ca(OH)$_2$ | 750 | 6.75 | 1.27 | 97.0 | 0.10 | 2.05 | 0.61 | 0.24 |
| 5 | Aluminum hydroxide | 1/1/1.81/0.001/0 | Na(OH) | 750 | 7.00 | 1.11 | 97.2 | 0.10 | 1.88 | 0.53 | 0.29 |
| 6 | Aluminum hydroxide | 1/1/1.81/0.126/0 | BaCO$_3$ | 750 | 7.20 | 1.27 | 97.3 | 0.05 | 1.62 | 0.75 | 0.28 |

TABLE 2

(EXAMPLES 7 TO 17)

| Example | Carrier | Atomic ratio Cu/Fe/Al/(alkali metal, alkaline earth metal)/Zn | Alkali metal/ alkaline earth metal hydroxide or the like | Catalyst calcining temp. (°C.) | Reaction velocity constant k ($\times 10^3$/min) | Filtration rate F ($m^3/cm^2$-Hr) | Alcohol | ME | Wax | Hydrocarbon | Others |
|---|---|---|---|---|---|---|---|---|---|---|---|
| 7 | Titanium oxide | 1/1/1.09/0.063/0 | Ba(OH)$_2$ | 750 | 8.00 | 1.01 | 97.5 | 0.05 | 1.65 | 0.68 | 0.12 |
| 8 | Zirconium oxide | 1/1/1.09/0.063/0 | Ba(OH)$_2$ | 750 | 7.00 | 0.92 | 97.2 | 0.07 | 1.71 | 0.91 | 0.19 |
| 9 | Zeolite | 1/1/1.65/0.063/0 | Ba(OH)$_2$ | 750 | 7.55 | 1.10 | 97.2 | 0.09 | 1.71 | 0.72 | 0.28 |
| 10 | Silica-alumina | 1/1/1.65/0.063/0 | Ba(OH)$_2$ | 750 | 7.95 | 1.36 | 97.4 | 0.09 | 1.65 | 0.59 | 0.27 |
| 11 | Ferric oxide | 1/1/1.09/0.063/0 | Ba(OH)$_2$ | 750 | 6.75 | 0.81 | 96.9 | 0.15 | 1.80 | 0.90 | 0.25 |
| 12 | Magnesium oxide | 1/1/1.09/0.063/0 | Ba(OH)$_2$ | 750 | 6.96 | 0.81 | 97.0 | 0.10 | 1.72 | 0.85 | 0.33 |
| 13 | Aluminum hydroxide | 1/0.5/3.0/0.063/0 | Ba(OH)$_2$ | 750 | 6.10 | 1.11 | 96.2 | 0.15 | 1.80 | 1.35 | 0.50 |
| 14 | Aluminum hydroxide | 1/1.5/0.7/0.063/0 | Ba(OH)$_2$ | 750 | 6.21 | 1.03 | 96.3 | 0.12 | 1.71 | 1.55 | 0.32 |
| 15 | Aluminum hydroxide | 1/1/0.7/0.063/0.05 | Ba(OH)$_2$ | 750 | 6.59 | 1.15 | 96.8 | 1.10 | 1.70 | 0.95 | 0.45 |
| 16 | Aluminum hydroxide | 1/2.0/1.09/0.063/0 | Ba(OH)$_2$ | 750 | 6.39 | 1.15 | 96.9 | 0.11 | 1.75 | 0.86 | 0.38 |
| 17 | Aluminum hydroxide | 1/0.5/1.09/0.063/0 | Ba(OH)$_2$ | 750 | 6.85 | 1.10 | 95.7 | 0.15 | 1.88 | 1.86 | 0.41 |

TABLE 3

EXAMPLES 18 TO 21 AND COMPARATIVE EXAMPLES 1 TO 6)

| Example | Carrier | Atomic ratio Cu/Fe/Al/(alkali metal, alkaline earth metal)/Zn | Alkali metal/ alkaline earth metal hydroxide or the like | Catalyst calcining temp. (°C.) | Reaction velocity constant k ($\times 10^3$/min) | Filtration rate F ($m^3/cm^2$-Hr) | Alcohol | ME | Wax | Hydrocarbon | Others |
|---|---|---|---|---|---|---|---|---|---|---|---|
| 18 | Aluminum hydroxide | 1/1/1.81/0.063/0 | Ba(OH)$_2$ | 450 | 4.98 | 1.80 | 94.9 | 0.12 | 1.79 | 2.73 | 0.46 |
| 19 | Aluminum hydroxide | 1/1/1.81/0.063/0 | Ba(OH)$_2$ | 600 | 6.01 | 1.35 | 96.6 | 0.09 | 1.78 | 1.18 | 0.45 |
| 20 | Aluminum hydroxide | 1/1/1.81/0.063/0 | Ba(OH)$_2$ | 900 | 7.32 | 0.48 | 97.5 | 0.08 | 1.65 | 0.42 | 0.35 |
| 21 | Aluminum hydroxide | 1/1/1.81/0.063/0 | Ba(OH)$_2$ | 1050 | 6.16 | 0.29 | 97.8 | 0.08 | 1.62 | 0.29 | 0.21 |
| Comparative Examples | | | | | | | | | | | |
| 1 | Aluminum hydroxide | 1/1/1.81/0/0 | no addition | 750 | 5.98 | 0.90 | 96.3 | 0.05 | 1.65 | 1.63 | 0.37 |
| 2 | Aluminum hydroxide | 1/4/1.81/0/0 | no addition | 750 | 3.26 | 0.55 | 91.1 | 0.16 | 2.12 | 6.21 | 0.41 |
| 3 | Aluminum | 1/1/5.5/0/0 | no addition | 750 | 3.89 | 0.51 | 91.6 | 0.10 | 2.09 | 6.09 | 0.12 |

TABLE 3-continued

EXAMPLES 18 TO 21 AND COMPARATIVE EXAMPLES 1 TO 6)

| Example | Carrier | Atomic ratio Cu/Fe/Al/(alkali metal, alkaline earth metal)/Zn | Alkali metal/ alkaline earth metal hydroxide or the like | Catalyst calcining temp. (°C.) | Reaction velocity constant k ($\times 10^3$/ min) | Filtration rate F ($m^3/cm^2$-Hr) | Composition (%) of product obtained by hydrogen reduction | | | | |
|---|---|---|---|---|---|---|---|---|---|---|---|
| | | | | | | | Alcohol | ME | Wax | Hydrocarbon | Others |
| 4 | hydroxide Aluminum hydroxide | 1/1/1.81/0/0 | no addition | 750 | 3.03 | 0.29 | 96.3 | 0.09 | 2.52 | 0.59 | 0.50 |
| 5 | — | 1/1/1.09/0/0 | no addition | 750 | 6.32 | 0.01 | 94.7 | 0.15 | 1.75 | 3.12 | 0.28 |
| 6 | — | 1/1/1.09/0/0 | no addition | 750 | 6.02 | 0.05 | 95.1 | 0.17 | 1.72 | 2.77 | 0.24 |

Thus, it is apparent that there has been provided a novel catalyst for hydrogenation use, as well as a process for the production of the hydrogenation catalyst. According to the present invention, a copper-iron-aluminum catalyst having markedly high activity and selectivity can be obtained, and, when the inventive catalyst is used, higher alcohols having markedly high purity can be obtained considerably easily.

While the invention has been described in detail and with reference to specific examples thereof, it will be apparent to one skilled in the art that various changes and modifications can be made therein without departing from the spirit and scope thereof.

What is claimed is:

1. A hydrogenation catalyst comprising copper-iron-aluminum-an alkali metal and/or an alkaline earth metal or copper-iron-aluminum-an alkali metal and/or an alkaline earth metal-zinc as an active ingredient, said active ingredient being precipitated on a carrier in a catalytically effective amount, wherein said carrier of said catalyst comprises at least one compound selected from oxides and hydroxides of aluminum, silicon, titanium, zirconium, magnesium or iron, zeolites or silica-alumina, and said catalyst has an atomic ratio, the atomic ratio being based on the active ingredient, of Cu/Fe/Al/(an active metal and/or an alkaline earth metal)/Zn = 1/0.4 to 2.5/0.1 to 5.0/0.001 to 0.4/0 to 1.0; wherein the ratio is based on both the active ingredient and the carrier when the carrier comprises an aluminum atom-containing substance.

2. A process for producing the hydrogenation catalyst of claim 1 which comprises the following steps (1), (2), (3) and (4) in the recited order:
   (1) suspending at least one carrier selected from oxides or hydroxides of aluminum, silicon, titanium, zirconium, magnesium or iron, zeolites or silica-alumina in an aqueous medium, and reacting a water soluble copper salt and a water soluble iron salt with an alkaline substance in the suspension, thereby precipitating a copper compound and an iron compound on the surface of said carrier;
   (2) reacting a water soluble aluminum salt with an alkaline substance in the suspension prepared in step (1), thereby precipitating an aluminum compound on the surface of solid particles in the suspension prepared in step (1);
   (3) recovering a precipitate from the suspension prepared in step (2), followed by washing the precipitate with water, to obtain a slurry or powder material; and
   (4) mixing (A) said slurry or powder material obtained in step (3) with (B) at least one compound selected from alkali metal salts, alkali metal hydroxides, alkaline earth metal salts or alkaline earth metal hydroxides, followed by drying and calcining of the resulting slurry or powder material.

3. A process for producing the hydrogenation catalyst of claim 1 which comprises the following steps (1), (2), (3) and (4) in the recited order:
   (1) suspending at least one carrier selected from oxides or hydroxides of aluminum, silicon, titanium, zirconium, magnesium or iron, zeolites or silica-alumina in an aqueous medium, and reacting a water soluble copper salt and a water soluble iron salt with an alkaline substance in the suspension, thereby precipitating a copper compound and an iron compound on the surface of said carrier;
   (2) (i) reacting a water soluble aluminum salt with an alkaline substance, or
   (ii) reacting a water soluble aluminum salt and a water soluble copper salt or a water soluble zinc salt or a mixture thereof with an alkaline substance, in the suspension prepared in step (1), thereby precipitating a compound or a plurality of compounds on the surface of solid particles which are present in the suspension prepared in step (1), wherein precipitating steps can be in any order when a plurality of compounds are precipitated, wherein the compound or a combination of compounds to be precipitated is selected from (a) an aluminum compound, (b) an aluminum compound and a copper compound, (c) an aluminum compound and a zinc compound or (d) an aluminum compound, a copper compound and a zinc compound;
   (3) recovering a precipitate from the suspension prepared in step (2), followed by washing with water, to obtain a slurry or powder material; and
   (4) mixing (A) said slurry or powder material obtained in step (3) with (B) at least one compound selected from alkali metal salts, alkali metal hydroxides, alkaline earth metal salts or alkaline earth metal hydroxides, followed by drying and calcining of the resulting slurry or powder material.

4. The process according to claim 2 wherein said steps (1) and (2) are performed at a reaction temperature of from 60° to 120° C.

5. The process according to claim 3 wherein said steps (1) and (2) are performed at a reaction temperature of from 60° to 120° C.

6. The process according to claim 2 wherein said calcining in step (4) is performed at a temperature of from 100° to 1,200° C.

7. The process according to claim 3 wherein said calcining in step (4) is performed at a temperature of from 100° to 1,200° C.

8. The process according to claim 2 wherein said steps (1) and (2) are performed at a reaction temperature of from 60° to 120° C. and said calcining in step (4) is performed at a temperature of from 100° to 1,200° C.

9. The process according to claim 3 wherein said steps (1) and (2) are performed at a reaction temperature of from 60° to 120° C. and said calcining in step (4) is performed at a temperature of from 100° to 1,200° C.

* * * * *